United States Patent
Chen et al.

(10) Patent No.: US 8,301,034 B2
(45) Date of Patent: Oct. 30, 2012

(54) OPTICAL MODULATION DEVICE

(75) Inventors: Jye hong Chen, Jhubei (TW);
Chun-Ting Lin, Taichung (TW);
Wen-Jr Jiang, Tucheng (TW);
Peng-Chun Peng, Jhonghe (TW); Po Tsung Shih, Tainan (TW); Er-zih Wong, Fongyuan (TW); Shih Kai Yeh, Taishan Township, Taipei County (TW);
Sien Chi, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 485 days.

(21) Appl. No.: 12/585,807

(22) Filed: Sep. 25, 2009

(65) Prior Publication Data
US 2010/0104294 A1    Apr. 29, 2010

(30) Foreign Application Priority Data
Oct. 28, 2008   (TW) ................. 97141404 A (51) Int. Cl.
*H04B 10/04*   (2006.01)
*H04B 10/12*   (2006.01)

(52) U.S. Cl. .................................................. 398/183
(58) Field of Classification Search .......... 398/182, 398/201
See application file for complete search history.

(56) References Cited

U.S. PATENT DOCUMENTS

| | | | |
|---|---|---|---|
| 5,497,385 A | 3/1996 | Schmuck | |
| 7,043,271 B1 | 5/2006 | Seto et al. | |
| 7,221,711 B2 | 5/2007 | Woodworth | |
| 7,346,279 B1 * | 3/2008 | Li et al. | 398/32 |
| 2006/0291868 A1 * | 12/2006 | Yee et al. | 398/152 |
| 2009/0316286 A1 * | 12/2009 | Litvin | 359/887 |

OTHER PUBLICATIONS

Jianjun Yu, Zhengsheng Jia, Lilin Yi, Yikai Su, Gee-Kung Chang, and Ting Wang; Optical Millimeter-Wave Generation of Up-Conversion Using External Modulators; IEEE Photonics Technology Letters, vol. 18, No. 1, Jan. 1, 2006, pp. 265-267.
Christina Lim, Manik Attygalle, Ampalavanapillai Nirmalathas, Dalma Novak, and Rod Waterhouse; Analysis of Optical Carrier-to-Sideband Ratio for Improving Transmission Performance in Fiber-Radio Links; IEEE Transaction on Microwave Theory and Techniques, vol. 54, No. 5, May 2006, pp. 2181-2187.
J. Park, W.V. Sorin, and K.Y. Lau; Elimination of the Fibre Chromatic Dispersion Penalty on 1550nm Millimetre-Wave Optical Transmission; Electronics Letters, Mar. 13, 1997, vol. 33, No. 6, pp. 512-513.
E. Vourch, D. Le Berre, and D. Herve; Lightwave Single Sideband Wavelength Self-Tunable Filter Using an InP:Fe Crystal for Fiber-Wireless Systems; IEEE Photonics Technology Letters, vol. 14, No. 2, Feb. 2002, pp. 194-196.

* cited by examiner

*Primary Examiner* — Shi K Li
(74) *Attorney, Agent, or Firm* — Rosenberg, Klein & Lee (57) ABSTRACT

The present invention discloses an optical modulation device, which comprises an electric signal generator generating an electric signal carrying a data signal; a first sinusoidal signal generator generating a first sinusoidal signal; an optical signal generator generating an input source optical signal; and an optoelectronic modulator (Mach-Zehnder modulator) receiving the input source optical signal, the electric signal and the first sinusoidal signal, biased to modify a transmission performance of the input source optical signal, modulating the input source optical signal with the electric signal and the first sinusoidal signal, and then sending out an output source optical signal carrying the electric signal and the first sinusoidal signal. The present invention realizes frequency multiplication, enables an optical signal to carry vector signals, and promotes the efficiency of broadband systems.

7 Claims, 8 Drawing Sheets

OPTICAL MODULATION DEVICE

BACKGROUND OF THE INVENTION

1. Field of the Invention

The present invention relates to a modulation device, particularly to an optical modulation device.

2. Description of the Related Art

Fiber-optical communication is a wired communication based on light and optical fiber, wherein light is modulated to carry information. Fiber-optical communication features high transmission capacity and high security and has been the primary method in wired communication nowadays. In fiber-optical communication, the optical carrier wave is overlaid or modulated by a message signal in the sender side and transmitted via a medium to a far-end recipient side and then demodulated by a receiver.

The ROF (Radio-Over-Fiber) system will play a very important role in the future broadband wireless communication, especially in the ultrabroadband 40 GHz-millimeter wave range. The conventional modulation technologies for optical communication include SSB (Single Side-Band), DSB (Double Side-Band) and DSBCS (Double Side-Band with optical Carrier Suppression). Due to the modulator's nonlinear transfer function, SSB and DSB have a smaller modulation depth and a lower sensitivity. DBSCS has a frequency multiplication function and a superior optical modulation depth. However, DSBCS is unable to carry vector signals, such as the PSK (Phase Shift Keying) signal and the QAM (Quadrature Amplitude Modulation) signal. Thus, the application of DSBCS is limited.

In the paper by E. Vourch, et al., IEEE Photonics Technology Letters, vol. 14, pp. 194-196, 2002, a special optical filter converts a DSB carrier signal into a SSB carrier signal and thus overcomes the problem of fiber dispersion in long distance signal transmission. However, the power of the RF signal is reduced thereby. In the paper by J. Yu, et al., IEEE Photonics Technology Letters, vol. 18, pp. 265-267, 2006, DSBCS is used to achieve frequency multiplication. However, the system uses two optoelectronic modulators and thus has a higher cost. Further, DSBCS is unable to generate vector signals.

To overcome the abovementioned problems, the present invention proposes an optical modulation device, which uses a frequency multiplication technology to break through the conventional modulation technology, generates vector signals and can integrate with a fiber-optical network or a wireless to implement long distance signal transmission.

SUMMARY OF THE INVENTION

The primary objective of the present invention is to provide an optical modulation device, which has a frequency multiplication function and enables an optical signal to carry vector signals, whereby the efficiency of bandwidth is promoted.

Another objective of the present invention is to provide an optical modulation device, which can integrate with a fiber-optical network or a wireless network to implement long distance signal transmission.

To achieve the abovementioned objectives, the present invention proposes an optical modulation device, which comprises an electric signal generator generating an electric signal carrying a data signal, a first sinusoidal signal generator generating a first sinusoidal signal, an optical signal generator generating an input source optical signal, and an optoelectronic modulator (Mach-Zehnder modulator). After receiving the input source optical signal, the electric signal and the first sinusoidal signal, the optoelectronic modulator is biased to modify the transmission performance of the input source optical signal and modulate the input source optical signal with the electric signal and the first sinusoidal signal and then sends out an output source optical signal carrying the electric signal and the first sinusoidal signal.

Below, the embodiments are described in detail in cooperation with the drawings to make easily understood the technical contents and accomplishments of the present invention.

DETAILED DESCRIPTION OF THE INVENTION

With the fast development of wired networks and wireless networks, the systems need higher and higher transmission rate and bandwidth. Thus, the ROF (Radio-Over-Fiber) technology will play a very important role in the future broadband wireless communication, especially in the millimeter band. The present invention can generate and transmit frequency-multiplication vector signals, whereby the bandwidth and system cost are effectively saved, and the sensitivity of the system is promoted. Therefore, the present invention widely applies to RF communication networks and fiber-optical communication works and has a high commercial value.

Figure 1:
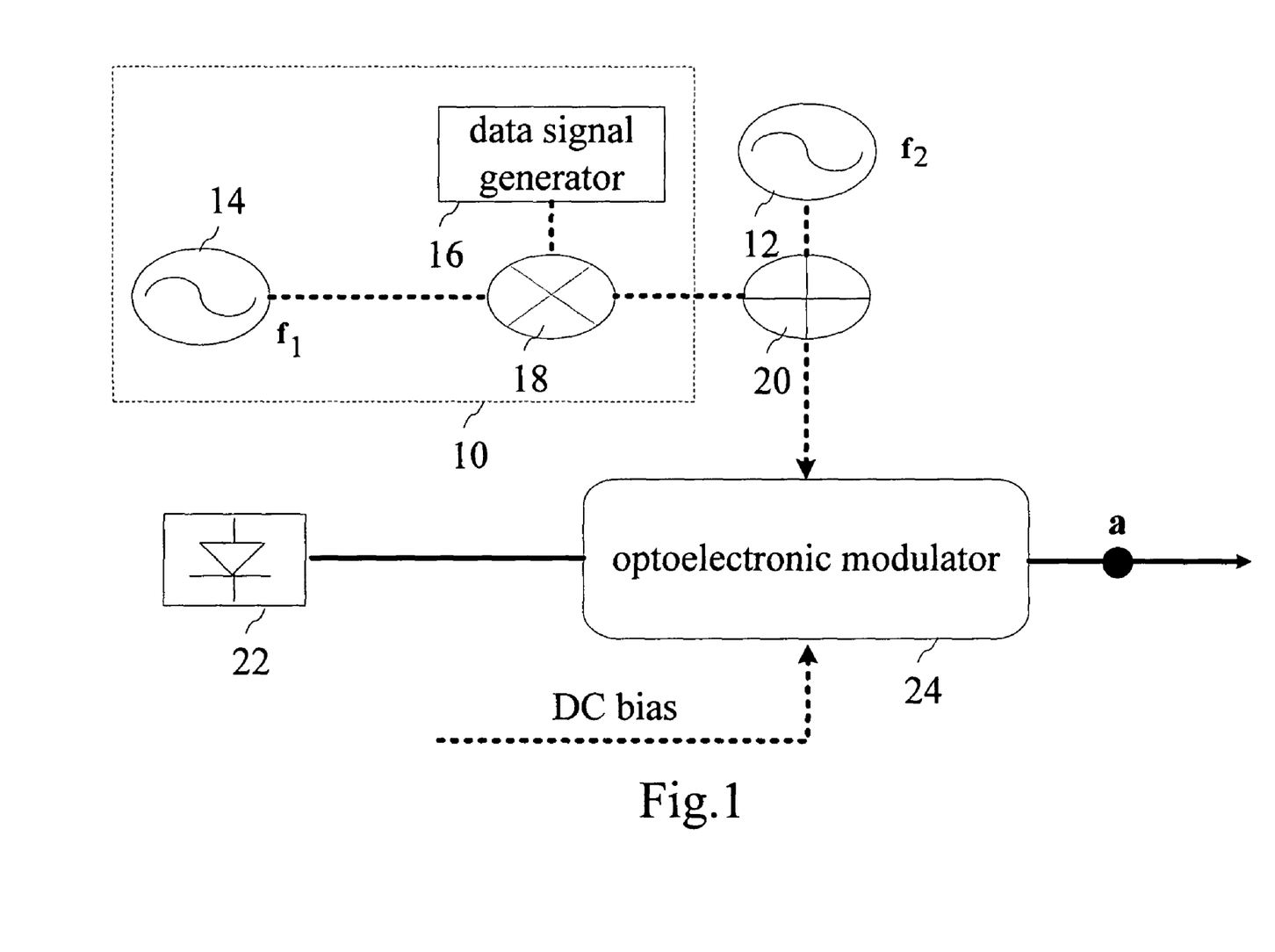
FIG. 1 is a diagram schematically showing the architecture of a system according to the present invention.

Refer to FIG. 1 a diagram schematically showing the architecture of a system according to the present invention, wherein the dotted lines represent the paths of electric signals, and the solid lines represent the paths of optical signals. The device of the present invention comprises an electric signal generator 10, a first sinusoidal signal generator 12, an adder 20, an optical signal generator 22, and an optoelectronic modulator (Mach-Zehnder modulator) 24. The electric signal generator 10 generates an electric signal carrying a data signal and having a frequency $f_1$. The data signal may be an ASK (Amplitude Shift Keying) signal, a vector-modulated signal, a PSK (Phase Shift Keying) signal, a QAM (Quadrature Amplitude Modulation) signal, or an OFDM (Orthogonal Frequency-Division Multiplexing) signal. The first sinusoidal signal generator 12 generates a first sinusoidal signal having a frequency $f_2$. The optical signal generator 22 generates an input source optical signal and may be a laser diode. The adder 20 receives and adds up the electric signal and the first sinusoidal signal and then outputs the resultant signal to the optoelectronic modulator 24. After receiving the input source optical signal, the electric signal and the first sinusoidal signal, the optoelectronic modulator 24 is biased by a voltage of $V_\pi$ to output a source optical signal with the optical carrier being suppressed, wherein the input source optical signal is modulated with the electric signal and the first sinusoidal signal to create an output source optical signal carrying the electric signal and the first sinusoidal signal. Varying the bias of the optoelectronic modulator 24 can vary the characteristic of the optical carrier of the input source optical signal.

The electric signal generator 10 further comprises a second sinusoidal signal generator 14, a data signal generator 16 and a wave mixer 18. The second sinusoidal signal generator 14 generates a second sinusoidal signal having a frequency $f_1$. The data signal generator 16 generates the data signal. The wave mixer 18 receives the second sinusoidal signal and the data signal, uses the second sinusoidal signal to frequency-upconvert the data signal and then outputs an electric signal having a frequency $f_1$ and carrying the data signal.

Below is described the operation of the entire system. Firstly, the second sinusoidal signal generator 14 and the data signal generator 16 respectively generate a second sinusoidal signal having a frequency $f_1$ and a data signal. The wave mixer 18 receives the second sinusoidal signal and the data signal, uses the second sinusoidal signal to frequency-upconvert the data signal and then outputs an electric signal having a frequency $f_1$ and carrying the data signal. The first sinusoidal signal generator 12 generates a first sinusoidal signal having a frequency $f_2$. The adder 20 receives and adds up the electric signal and the first sinusoidal signal and then outputs the resultant signal to the optoelectronic modulator 24. In addition to the electric signal and the first sinusoidal signal, the optoelectronic modulator 24 also receives an input source optical signal from the laser diode 22. Then, the optoelectronic modulator 24 is biased by a voltage of $V_\pi$ to modify the characteristic of the optical carrier of the input source optical signal, modulates the input source optical signal with the electric signal and the first sinusoidal signal, and sends out an output source optical signal carrying the electric signal and the first sinusoidal signal.

Figure 2:
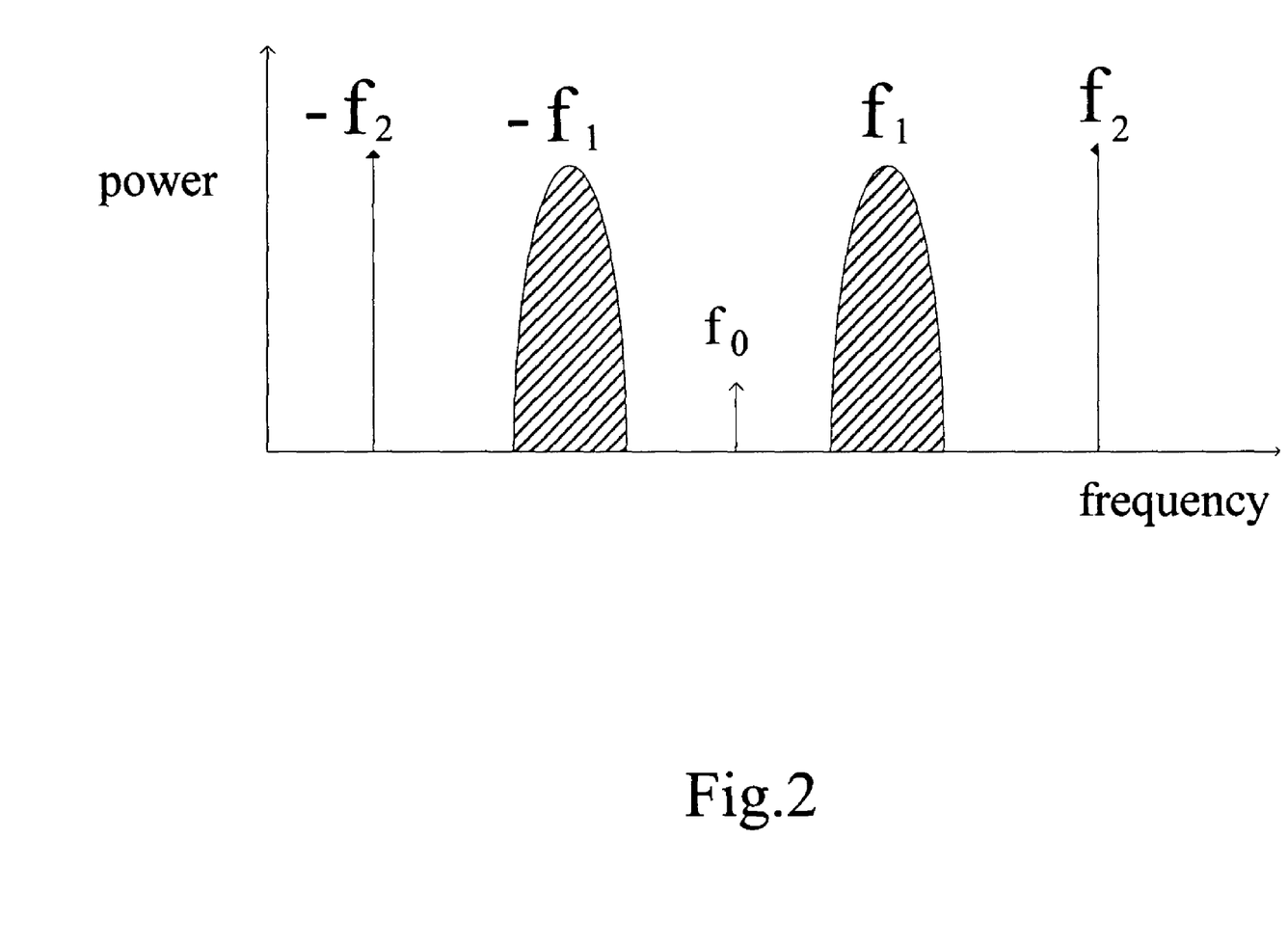
FIG. 2 is a diagram schematically showing the frequency spectrum of the output source optical signal according to the present invention.

Refer to FIG. 2 a diagram schematically showing the frequency spectrum of the optical signal at Point a in FIG. 1. The output source optical signal contains a left-side electric signal having a frequency of $f_0-f_1$, a right-side electric signal having a frequency of $f_0+f_1$, a left-side first sinusoidal signal having a frequency of $f_0-f_2$, and a right-side first sinusoidal signal having a frequency of $f_0+f_2$ with the symmetric center being the frequency $f_0$ of the optical carrier. Suppose the output source optical signal is sent into a photodetector. Then, the photodetector sends out an electric signal, which is a frequency-multiplication signal with a frequency of $f_1+f_2$ and equal to the square of the electric field of the optical signal.

Figure 3:
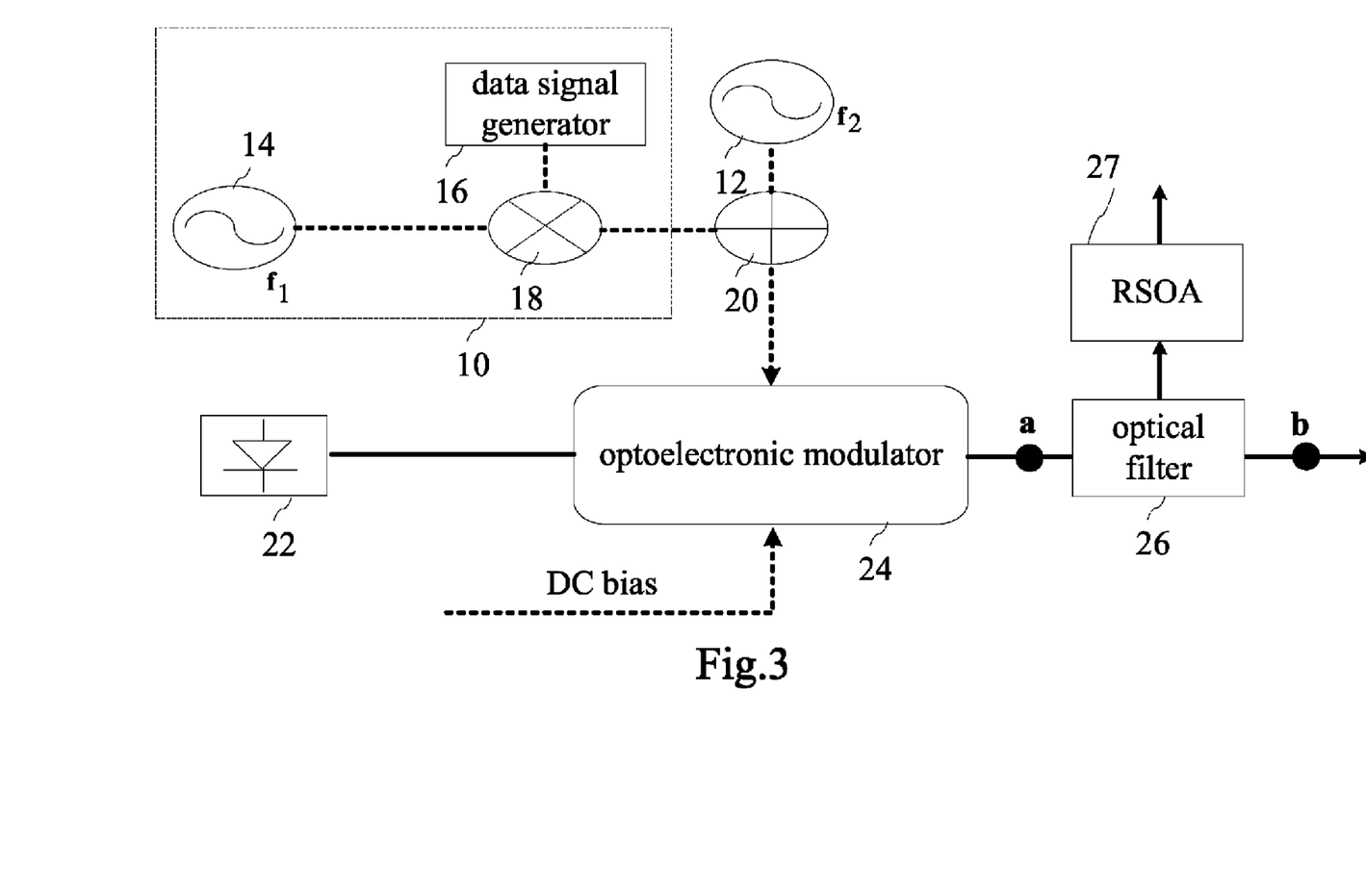
FIG. 3 is a diagram schematically showing the architecture of another system according to the present invention.
Figure 4:
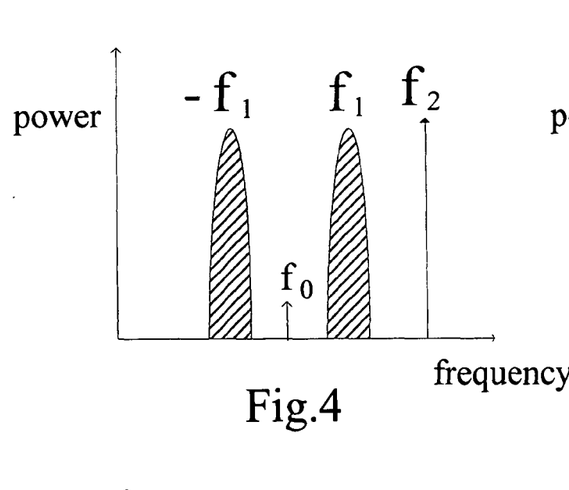
FIGS. 4-7 are diagrams schematically showing the probable frequency spectrums of the output source optical signal after the processing of the optical filter according to the present invention.

Refer to FIG. 3 a diagram schematically showing the architecture of another system according to the present invention. Different from the system in FIG. 1, the system in FIG. 3 additionally has an optical filter 26. When the output source optical signal passes the optical filter 26, a portion of signal carried by the output source optical signal is filtered out. Refer to from FIG. 4 to FIG. 7 and refer to FIG. 2 also. FIGS. 4-7 are diagrams schematically showing the probable frequency spectrums of the optical signal at Point b in FIG. 3. In FIG. 4, the left-side first sinusoidal signal having a frequency of $f_0-f_2$ is filtered out. Alternatively, the right-side first sinusoidal signal having a frequency of $f_0+f_2$ may be filtered out.

Figure 5:
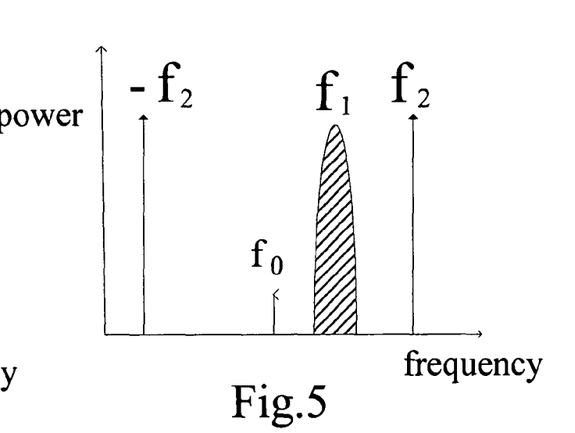
Figure 6:
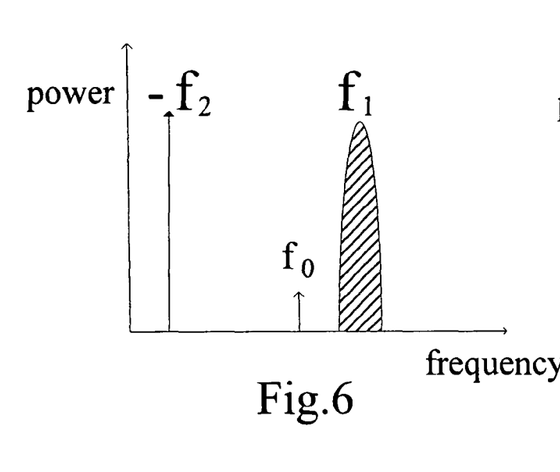
Figure 7:
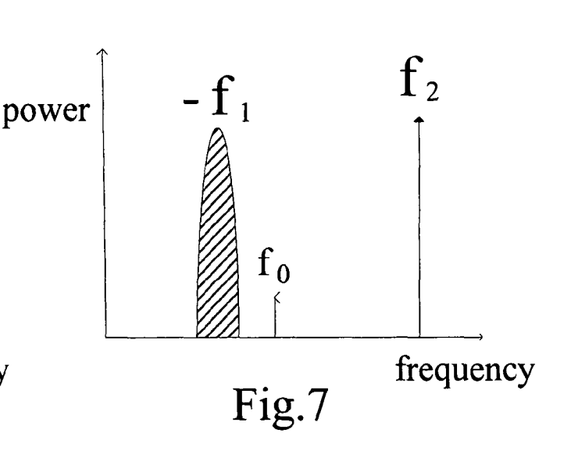

In FIG. 5, the left-side electric signal having a frequency of $f_0-f_1$ is filtered out. In FIG. 6, the left-side electric signal having a frequency of $f_0-f_1$ and the right-side first sinusoidal signal having a frequency of $f_0+f_2$ are filtered out. In FIG. 7, the right-side electric signal having a frequency of $f_0+f_1$ and the left-side first sinusoidal signal having a frequency of $f_0-f_2$ are filtered out. Filtering out the above-mentioned signals can overcome the periodical power attenuation caused by fiber dispersion in long distance signal transmission. The signals, which are filtered out by the optical filter 26, can be transmitted to the user side via RSOA (Reflective Semiconductor Optical Amplifier) 27.

Figure 8:
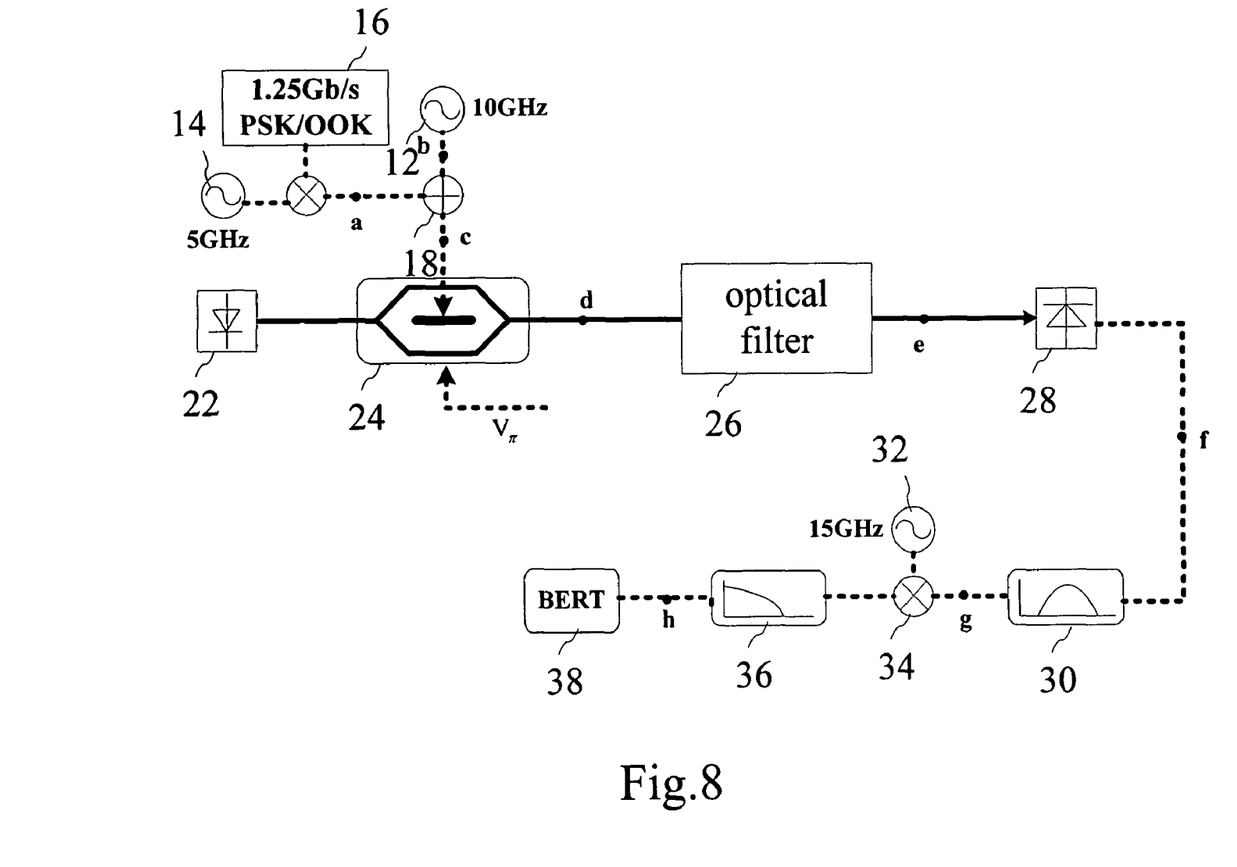
FIG. 8 is a diagram schematically showing the architecture of an experimental system for verifying the utility of the present invention according to the present invention.
Figures 9A, 9B, 9C, 9D:
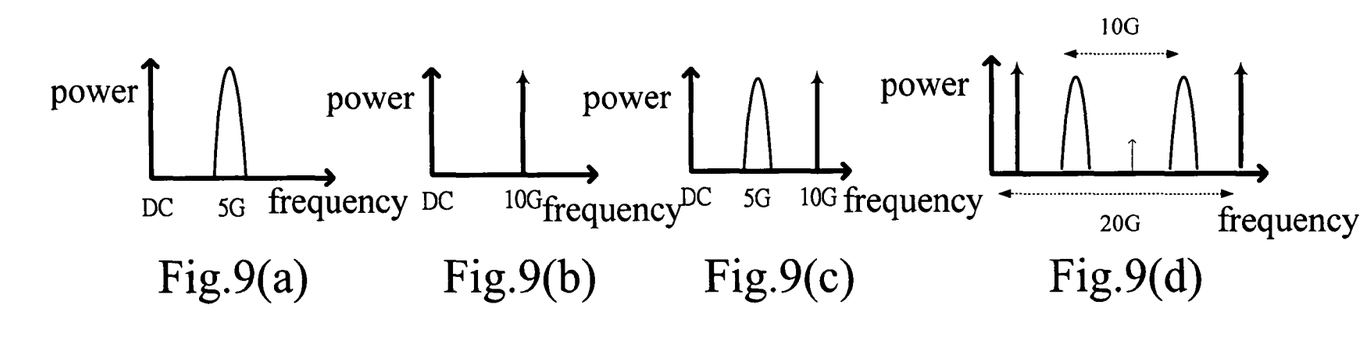
FIGS. 9(a)-9(h) are diagrams schematically showing the frequency spectrums of electrical signals according to the present invention.
Figure 9E:
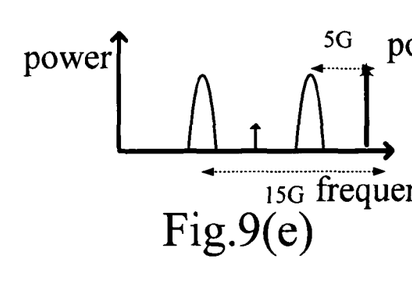

Refer to FIG. 8 a diagram schematically showing the architecture of an experimental system for verifying the utility of the present invention. Also refer to from FIG. 9(*a*) to FIG. 9(*h*) for the frequency spectrums of signals. Herein, the first sinusoidal signal has a frequency of 10 GHz, and the second sinusoidal signal has a frequency of 5 GHz, and a PSK or OOK (On-OFF Keying) signal of 1.25 Gb/sec is used to exemplify the data signal. Firstly is described the signals in the front stages of the experimental system. FIG. 9(*a*) shows the frequency spectrum of the electric signal at Point a in FIG. 8, whereat the data signal has been frequency-upconverted with the second sinusoidal. Therefore, the signal output from Point a carries the data signal, and the frequency spectrum thereof centers at a frequency of 5 GHz and slightly extends up and down therefrom. FIG. 9(*b*) shows the frequency spectrum of the electric signal at Point b in FIG. 8, whereat the first sinusoidal signal is just output. Therefore, the signal output from Point b is the first sinusoidal signal centering at a frequency of 10 GHz. FIG. 9(*c*) shows the frequency spectrum of the electric signal at Point c in FIG. 8, whereat the signal contains the 5 GHz electric signal and the 10 GHz first sinusoidal signal. FIG. 9(*d*) shows the frequency spectrum of the optical signal at Point d in FIG. 8. The optoelectronic modulator 24 is biased by a voltage of $V_\pi$. Therefore, the output source optical signal at Point d contains the rightmost first sinusoidal signal, the right-side electric signal beside the rightmost first sinusoidal signal, the left-side electric signal and the left-side first sinusoidal signal respectively symmetric to the two right-side signals. The frequency difference between the left-side electric signal and the right-side electric signal is double the frequency of the original electric signal; the frequency difference between the left-side first sinusoidal signal and the right-side first sinusoidal signal is double the frequency of the original first sinusoidal signal. FIG. 9(*e*) shows the frequency spectrum of the optical signal at Point e in FIG. 8, whereat the optical filter 26 has filtered out the left-side first sinusoidal signal of the output source optical signal; the frequency difference between the left-side electric signal and the right-side first sinusoidal signal is 15 GHz; the frequency difference between the right-side electric signal and the right-side first sinusoidal signal is 5 GHz.

Figures 9F, 9G, 9H:
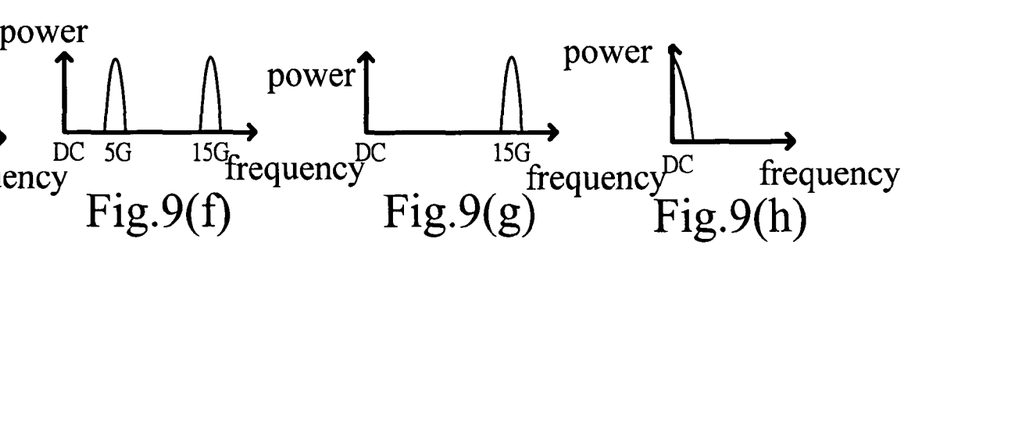

Below is described the signals in the rear stages of the experimental system shown in FIG. 8. Different from the architecture in FIG. 3, the architecture in FIG. 8 additionally has a photodetector 28, a band pass filter 30, a sinusoidal signal generator 32, a wave mixer 34, a low-pass filter 36, and a BER (Bit Error Rate) tester 38 sequentially arranged behind the optical filter 26. The output source optical signal leaves the optical filter 26, passes through the optical fiber and reaches the photodetector 28. The photodetector 28 converts the output source optical signal into an electric signal. FIG. 9(*f*) shows the frequency spectrum of the electric signal at Point f in FIG. 8, whereat the electric signal contains the electric signal centering at 5 GHz and the electric signal centering at 15 GHz. Next, the band pass filter 30 filters out the unwanted signal and only allows the desired 15 GHz signal to pass. Therefore, the electric signal at Point g contains only the 15 GHz signal, as shown in FIG. 9(g). Next, the wave mixer 34 receives the abovementioned 15 GHz signal and the sinusoidal signal generated by the sinusoidal signal generator 32 and frequency-downconverts the 15 GHz signal with the sinusoidal signal. Next, the 1.25 GHz low-pass filter 36 filters the frequency-downconverted signal to obtain a low-frequency signal shown in FIG. 9(h). Then, the BER tester 38 examines whether there is power attenuation in the low-frequency signal.

Figure 10:
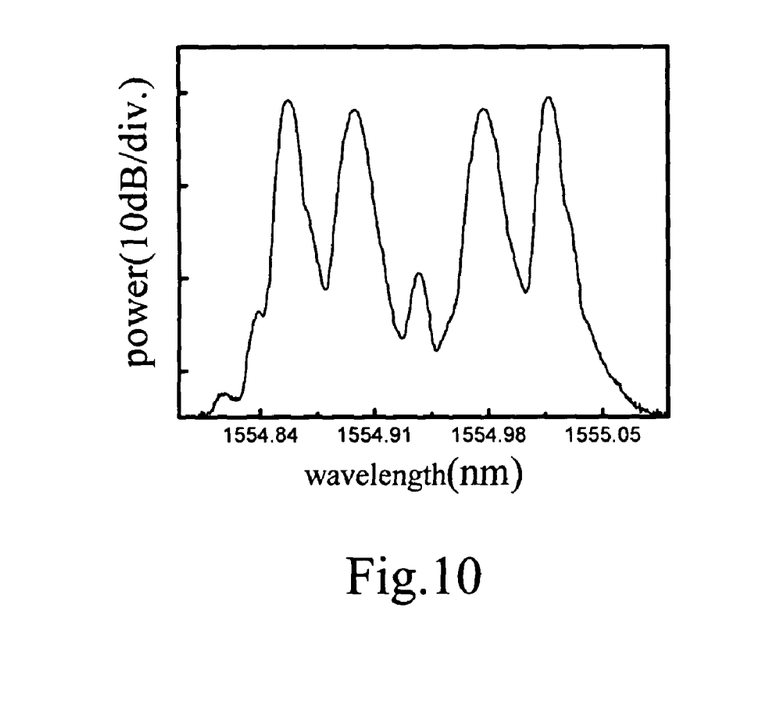
FIG. 10 is a diagram showing the frequency spectrum of the output source optical signal before the procession of the optical filter according to the present invention.
Figure 11:
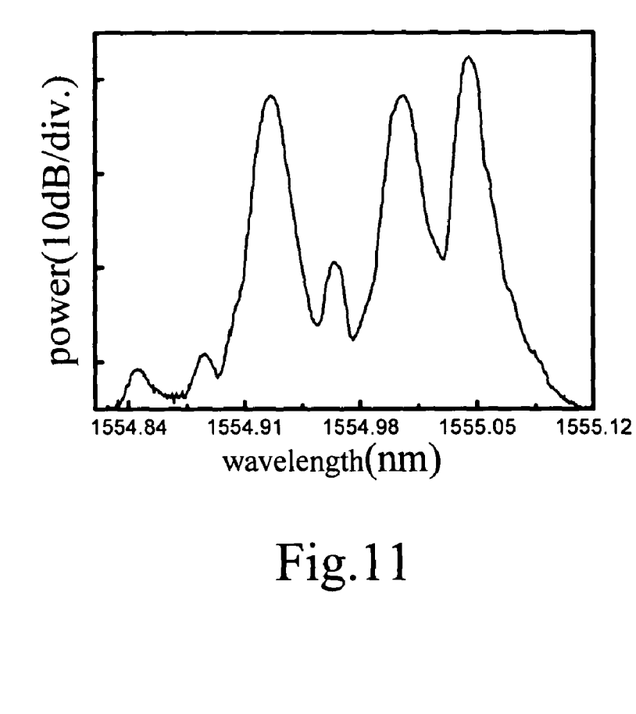
FIG. 11 is a diagram showing the frequency spectrum of the output source optical signal after the procession of the optical filter according to the present invention.

Refer to FIG. 10 and FIG. 11. FIG. 10 is a diagram showing the frequency spectrum of the output source optical signal before the procession of the optical filter, wherein the output source optical signal contains a right-side first sinusoidal signal, a right-side electric signal, and a left-side first sinusoidal signal and a left-side electric signal both symmetric to the two right-side signals. FIG. 11 is a diagram showing the frequency spectrum of the output source optical signal after the procession of the optical filter, wherein the left-side first sinusoidal signal has been filtered out.

Figure 12:
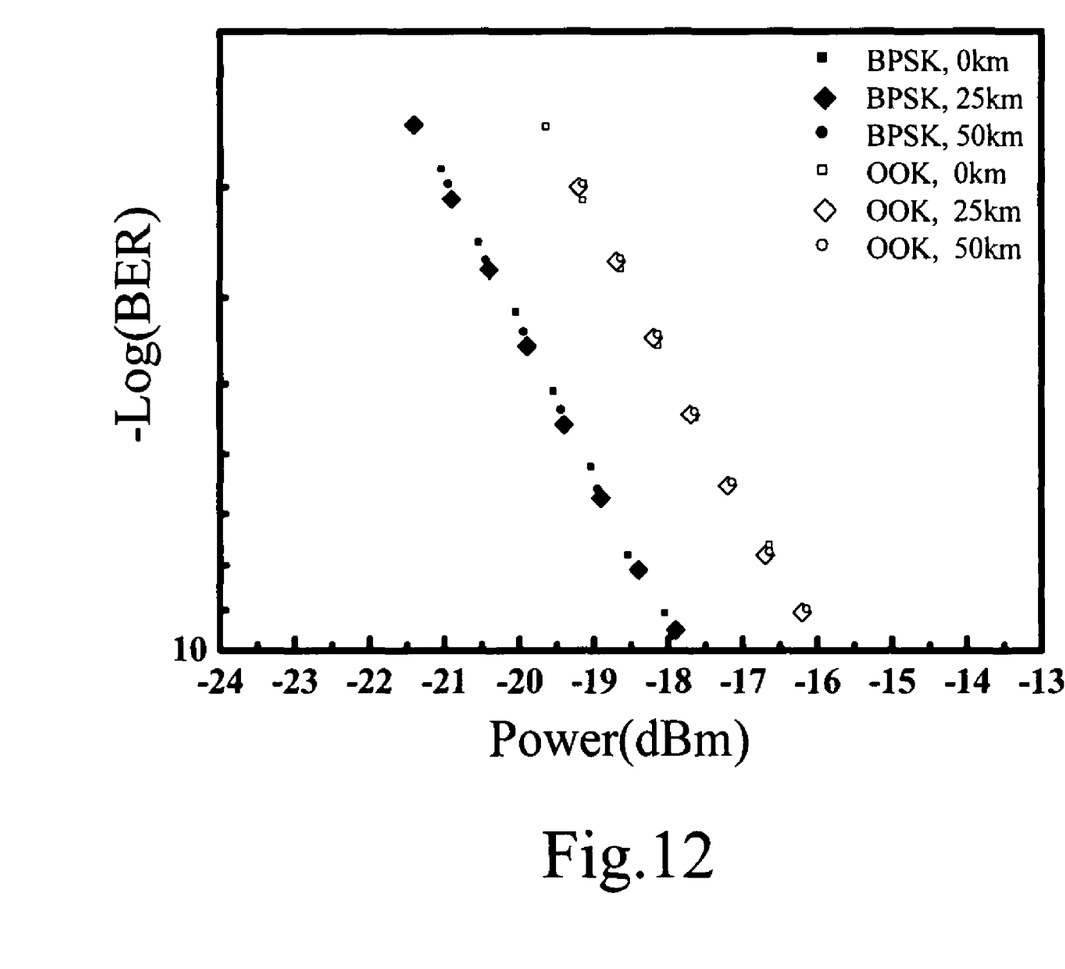
FIG. 12 is a diagram showing the BER curves of the BPSK signal and the OOK signal according to the present invention.

Refer to FIG. 12 a diagram showing the BER curves of the BPSK (Binary Phase Shift Keying) signal and the OOK signal. No matter a 25 km transmission or a 50 km transmission does not deteriorate the sensitivity of receiving the signals. Therefore, the experiment proves the present invention can realize long distance signal transmission without the penalty of receiver sensitivity and has technical utility.

In conclusion, the present invention realizes frequency multiplication, enables an optical signal to carry vector signals, and promotes the efficiency of broadband systems. Further, the present invention can integrate with wireless or fiber-optical networks to undertake long distance signal transmission.

The embodiments described above are only to exemplify the present invention but not to limit the scope of the present invention. Therefore, any equivalent modification or variation according to the shapes, structures, characteristics and spirit disclosed in the present invention is to be also included within the scope of the present invention.

What is claimed is:

1. An optical modulation device, comprising:
  an electric signal generator generating an electric signal carrying a data signal;
  a first sinusoidal signal generator generating a first sinusoidal signal;
  an optical signal generator generating an input source optical signal; and
  an optoelectronic modulator receiving said input source optical signal, said electric signal and said first sinusoidal signal, biased to modify a transmission performance of said input source optical signal, modulating said input source optical signal with said electric signal and said first sinusoidal signal, and then sending out an output source optical signal carrying said electric signal and said first sinusoidal signal;
  wherein said output source optical signal, which is formed via modulating said input source optical signal with said electric signal and said first sinusoidal signal, includes:
  a right-side electric signal and a left-side electric signal symmetric to said right-side electric signal; a right-side first sinusoidal signal and a left-side first sinusoidal signal symmetric to said right-side first sinusoidal signal; and
  a symmetric center thereof is a frequency of an optical carrier of said output source optical signal;
  an optical filter receives said output source optical signal and filters out said right-side first sinusoidal signal and said left-side electric signal or filters out said right-side electric signal and said left-side first sinusoidal signal, whereby the filtered out signal is transmitted to a user via a Reflective Semiconductor Optical Amplifier (RSOA).

2. The optical modulation device according to claim 1, wherein said data signal is a vector-modulated signal, an ASK (Amplitude Shift Keying) signal, a PSK (Phase Shift Keying) signal, a QAM (Quadrature Amplitude Modulation) signal, or an OFDM (Orthogonal Frequency-Division Multiplexing) signal.

3. The optical modulation device according to claim 1, wherein said electric signal generator further comprises
  a second sinusoidal signal generator generating a second sinusoidal signal;
  a data signal generator generating said data signal; and
  a wave mixer receiving said second sinusoidal signal and said data signal, using said second sinusoidal signal to frequency-upconvert said data signal, and then outputting said electric signal.

4. The optical modulation device according to claim 1 further comprising an adder receiving and adding up said electric signal and said first sinusoidal signal and then outputting a resultant signal to said optoelectronic modulator.

5. The optical modulation device according to claim 1, wherein said input source optical signal is a laser source optical signal.

6. The optical modulation device according to claim 1, wherein said output source optical signal, which is formed via modulating said input source optical signal with said electric signal and said first sinusoidal signal, contains a right-side electric signal and a left-side electric signal symmetric to said right-side electric signal;
  said output source optical signal also contains a right-side first sinusoidal signal and a left-side first sinusoidal signal symmetric to said right-side first sinusoidal signal;
  a symmetric center thereof is a frequency of an optical carrier of said output source optical signal;
  an optical filter receives said output source optical signal and filters out one of said right-side electric signal, said left-side electric signal, said right-side first sinusoidal signal, and said left-side first sinusoidal signal.

7. The optical modulation device according to claim 1, wherein said optoelectronic modulator is biased by a voltage of $V_\pi$.

* * * * *